US010462185B2

(12) United States Patent
Attfield et al.

(10) Patent No.: US 10,462,185 B2
(45) Date of Patent: Oct. 29, 2019

(54) POLICY-MANAGED SECURE CODE EXECUTION AND MESSAGING FOR COMPUTING DEVICES AND COMPUTING DEVICE SECURITY (71) Applicant: Sequitur Labs, Inc., Issaquah, WA (US)

(72) Inventors: Philip Attfield, Fall City, WA (US); Daniel Schaffner, Seattle, WA (US); Michael Thomas Hendrick, Renton, WA (US)

(73) Assignee: Sequitur Labs, Inc., Issaquah, WA (US)

( * ) Notice: Subject to any disclaimer, the term of this patent is extended or adjusted under 35 U.S.C. 154(b) by 70 days.

(21) Appl. No.: 15/503,667

(22) PCT Filed: Sep. 4, 2015

(86) PCT No.: PCT/US2015/048526
§ 371 (c)(1),
(2) Date: Feb. 13, 2017

(87) PCT Pub. No.: WO2016/037048
PCT Pub. Date: Mar. 10, 2016

(65) Prior Publication Data
US 2017/0244759 A1    Aug. 24, 2017

(51) Int. Cl.
G06F 17/00    (2019.01)
H04L 29/06    (2006.01)
(Continued)

(52) U.S. Cl.
CPC ............. H04L 63/20 (2013.01); G06F 21/53 (2013.01); G06F 21/57 (2013.01); H04L 9/0894 (2013.01);
(Continued)

(58) Field of Classification Search
CPC ......... H04L 63/20; H04L 63/10; G06F 21/53; G06F 21/57
(Continued)

(56) References Cited

U.S. PATENT DOCUMENTS 5,881,225 A    3/1999 Worth
7,140,035 B1   11/2006 Karch
(Continued)

FOREIGN PATENT DOCUMENTS

EP      EP1339199        8/2003
WO      PCT/US06/017123  1/2008
(Continued)

OTHER PUBLICATIONS

Computer Architecture: A Quantitative Approach, Hennessy J. and Patterson, D. , 5th Ed. Morgan Kaufman (2011).
(Continued)

Primary Examiner — Haresh N Patel
(74) Attorney, Agent, or Firm — JRG Attorneys at Law (57) ABSTRACT A system for policy-managed secure code execution and messaging for computing devices where each trusted application is managed independently of others and is not visible to unauthorized inspection or execution. If a file bundle received by the system contains metadata concerning the context of the file or its execution, the metadata is decrypted if necessary. If the file bundle containing the executable code is encrypted, its key is stored in a policy server to await adjudication of the request to execute. If the policy server allows execution of the executable code, the key stored in the policy server is used to decrypt the file bundle and the resulting executable code is stored as a trusted application in secure memory. Future requests to execute the trusted application are adjudicated by the policy server and enforced by
(Continued)

the exclusive policy execution point associated with that trusted application in secure memory.

9 Claims, 7 Drawing Sheets

(51) Int. Cl.
*G06F 21/53* (2013.01)
*G06F 21/57* (2013.01)
*H04L 9/08* (2006.01)
*H04W 12/02* (2009.01)

(52) U.S. Cl.
CPC ........ *H04L 63/0428* (2013.01); *H04L 63/062* (2013.01); *H04L 63/10* (2013.01); *H04W 12/02* (2013.01); *G06F 2221/034* (2013.01)

(58) Field of Classification Search
USPC .......................................................... 726/1
See application file for complete search history.

(56) References Cited

U.S. PATENT DOCUMENTS

| | | | |
|---|---|---|---|
| 7,240,015 B1 | 6/2007 | Karmouch | |
| 7,246,233 B2 | 7/2007 | Brabson et al. | |
| 7,400,891 B2 | 7/2008 | Aaron | |
| 7,640,429 B2 | 12/2009 | Huang et al. | |
| 7,797,544 B2 | 9/2010 | Dillaway | |
| 7,941,647 B2 | 5/2011 | Yates | |
| 8,014,721 B2 | 9/2011 | Johnson | |
| 8,037,318 B2 | 10/2011 | Tahan | |
| 8,127,982 B1 | 3/2012 | Casey et al. | |
| 8,135,385 B2 | 3/2012 | Ohta | |
| 8,176,336 B1 | 5/2012 | Mao | |
| 8,185,959 B2 | 5/2012 | Bellwood | |
| 8,230,399 B2 | 7/2012 | Vertes | |
| 8,285,249 B2 | 10/2012 | Baker et al. | |
| 8,321,498 B2 | 11/2012 | Maes | |
| 8,463,819 B2 | 6/2013 | Shashikumar et al. | |
| 8,468,586 B2 | 6/2013 | Kootayi et al. | |
| 8,468,608 B1 | 6/2013 | Hernacki | |
| 8,538,843 B2 | 9/2013 | Smith | |
| 8,922,372 B2 | 1/2014 | Soffer | |
| 8,688,592 B1 | 4/2014 | Abramson | |
| 8,782,441 B1* | 7/2014 | Osterwalder | G06F 21/6218 713/193 |
| 8,880,047 B2 | 11/2014 | Konicek | |
| 8,930,497 B1* | 1/2015 | Holmes | G06F 15/16 709/217 |
| 9,053,456 B2 | 6/2015 | Verthein | |
| 9,391,782 B1 | 7/2016 | Mironenko | |
| 9,411,962 B2 | 8/2016 | Attfield | |
| 2002/0101826 A1 | 8/2002 | Giacopelli | |
| 2002/0138814 A1 | 9/2002 | Katayama | |
| 2003/0125925 A1 | 7/2003 | Walther | |
| 2004/0123139 A1 | 6/2004 | Aiello | |
| 2004/0123153 A1 | 6/2004 | Wright | |
| 2004/0204949 A1 | 10/2004 | Shaji | |
| 2005/0132202 A1 | 6/2005 | Billaway | |
| 2005/0193196 A1 | 9/2005 | Huang | |
| 2006/0005239 A1 | 1/2006 | Mondri | |
| 2006/0026548 A1 | 2/2006 | Rosener | |
| 2006/0059565 A1 | 3/2006 | Green | |
| 2006/0150256 A1 | 7/2006 | Fanton | |
| 2006/0236369 A1 | 10/2006 | Covington | |
| 2006/0236385 A1 | 10/2006 | Innes | |
| 2007/0150559 A1 | 6/2007 | Smith | |
| 2008/0059633 A1* | 3/2008 | Hu | H04L 41/0893 709/225 |
| 2008/0085698 A1 | 4/2008 | Gamm | |
| 2008/0133914 A1 | 6/2008 | Isaacson | |
| 2008/0184336 A1 | 7/2008 | Sarukkai | |
| 2008/0194233 A1 | 8/2008 | Henry | |
| 2008/0301757 A1* | 12/2008 | Demarest | G06Q 10/10 726/1 |
| 2009/0031141 A1 | 1/2009 | Pearson | |
| 2009/0089125 A1 | 4/2009 | Sultan | |
| 2009/0100269 A1 | 4/2009 | Naccache | |
| 2009/0193503 A1 | 7/2009 | Shevehenko | |
| 2009/0198617 A1 | 8/2009 | Soghoian | |
| 2009/0204785 A1 | 8/2009 | Yates, Jr. et al. | |
| 2009/0205016 A1 | 8/2009 | Milas | |
| 2009/0300174 A1 | 12/2009 | Floris | |
| 2009/0327401 A1* | 12/2009 | Gage | G06F 15/16 709/203 |
| 2010/0023454 A1 | 1/2010 | Exton | |
| 2010/0023703 A1 | 1/2010 | Christie | |
| 2010/0037311 A1 | 2/2010 | He | |
| 2010/0199325 A1 | 8/2010 | Raleigh | |
| 2010/0216429 A1 | 8/2010 | Mahajan | |
| 2010/0250370 A1 | 9/2010 | Jones et al. | |
| 2011/0055890 A1 | 3/2011 | Gaulin | |
| 2011/0063098 A1 | 3/2011 | Fischer | |
| 2011/0077758 A1 | 3/2011 | Tran | |
| 2011/0154034 A1 | 6/2011 | Bailey, Jr. | |
| 2011/0173108 A1 | 7/2011 | Rajasekar | |
| 2011/0173122 A1 | 7/2011 | Singhal | |
| 2011/0251958 A1 | 10/2011 | Aubin | |
| 2011/0258692 A1 | 10/2011 | Morrison | |
| 2011/0270751 A1 | 11/2011 | Csinger | |
| 2012/0030731 A1 | 2/2012 | Bhargava | |
| 2012/0129450 A1 | 5/2012 | Lee | |
| 2012/0197743 A1 | 8/2012 | Grigg | |
| 2012/0214516 A1 | 8/2012 | Rosenberg | |
| 2012/0216012 A1 | 8/2012 | Vorbach et al. | |
| 2012/0260086 A1* | 10/2012 | Haggerty | H04W 8/265 713/150 |
| 2012/0270523 A1 | 10/2012 | Laudermilch | |
| 2012/0323596 A1 | 12/2012 | Verhulst | |
| 2012/0323717 A1 | 12/2012 | Kirsch | |
| 2013/0007063 A1* | 1/2013 | Kalra | G06F 17/30893 707/796 |
| 2013/0029653 A1 | 1/2013 | Baker et al. | |
| 2013/0080411 A1 | 3/2013 | Rolia | |
| 2013/0097417 A1* | 4/2013 | Lauter | H04L 9/008 713/150 |
| 2013/0125099 A1 | 5/2013 | Budiu | |
| 2013/0130650 A1 | 5/2013 | Cheung | |
| 2013/0145429 A1 | 6/2013 | Mendel | |
| 2013/0212022 A1 | 8/2013 | Lanc | |
| 2013/0253942 A1 | 9/2013 | Liu et al. | |
| 2013/0275746 A1 | 10/2013 | Galdwin | |
| 2013/0298664 A1 | 11/2013 | Gillette, II | |
| 2014/0007193 A1 | 1/2014 | Qureshi | |
| 2014/0013112 A1 | 1/2014 | Cidon | |
| 2014/0096186 A1 | 4/2014 | Barton | |
| 2014/0115659 A1 | 4/2014 | Attfield et al. | |
| 2014/0143089 A1 | 5/2014 | Campos | |
| 2014/0164776 A1* | 6/2014 | Hook | H04L 9/14 713/171 |
| 2014/0173700 A1 | 6/2014 | Awan | |
| 2014/0195425 A1 | 7/2014 | Campos | |
| 2014/0279474 A1 | 9/2014 | Evans | |
| 2014/0379361 A1 | 12/2014 | Mahakar | |
| 2015/0188789 A1* | 7/2015 | Jayaprakash | G06F 11/3003 709/224 |
| 2015/0227925 A1 | 8/2015 | Filler | |
| 2015/0271013 A1* | 9/2015 | Singh | H04L 12/1813 709/220 |
| 2015/0278810 A1 | 10/2015 | Ramatchandirane | |
| 2015/0302409 A1 | 10/2015 | Malek | |
| 2015/0304736 A1* | 10/2015 | Lal | G06F 21/10 380/210 |
| 2015/0309811 A1* | 10/2015 | Wisgo | H04W 4/00 719/331 |
| 2015/0312277 A1 | 10/2015 | Rane et al. | |
| 2015/0334133 A1 | 11/2015 | Schaffner et al. | |
| 2015/0350254 A1 | 12/2015 | Hendrick et al. | |
| 2015/0358822 A1 | 12/2015 | Hendrick et al. | |

(56) References Cited

U.S. PATENT DOCUMENTS

| | | |
|---|---|---|
| 2016/0012216 A1 | 1/2016 | Attfield et al. |
| 2016/0314296 A1 | 10/2016 | Martini et al. |
| 2017/0048714 A1 | 2/2017 | Attfield et al. |

FOREIGN PATENT DOCUMENTS

| | | |
|---|---|---|
| WO | PCT/US08/009313 | 2/2009 |
| WO | PCT/US14/70897 | 12/2014 |
| WO | WO2015/026389 | 2/2015 |
| WO | PCT/US15/24932 | 4/2015 |
| WO | PCT/US15/27561 | 4/2015 |
| WO | PCT/US15/048526 | 3/2016 |
| WO | PCT/US16/28481 | 10/2016 |
| WO | PCT/US16/032502 | 11/2016 |
| WO | PCT/US16/029144 | 2/2017 |

OTHER PUBLICATIONS

"Computer Networks", Tanenbaum, A. Andrew and Wetherall, D., 5th Ed. Prentice Hall (2010.
"Prolog Programming: A First Course", BRNA, P. (Mar. 5, 2001). Retrieved from <http://homepages.inf.ed.ac.ud/pbma/prolog book/> on Mar. 16, 2013.
NFC Forum(2007), "Near Field Communication and the NFC Forum: The Keys to Truly Interoperable Communications" (PDF), http://www.nfc-forum.org, retrieved Oct. 30, 2012.
Landt, Jerry (2001), "Shrouds of Time: The history of RFID", AIM, Inc, pp. 5-7.
Bluetooth Special Interest Group website, "A Look at the Basics of Bluetooth Wireless Technology", http:www.bluetooth.com/Pages/Basics.aspx, retrieved Oct. 29, 2012.
See e.g. H. Schildt, C ++—The Complete Reference, 2nd edition, pp. 67-70 McGraw Hall, 1995, ISBN 0-07-882123-1.
K. Ashton, That 'Internet of Things' Thing, RFID Journal Jun. 22, 2009 (available online as of Oct. 20, 2013 at http://www.rfidjournal.com/articles/view?4986).
T. White, Hadoop—The Definitive Guide, OReilly, 2009, ISBN 978-0-596-52197-4.
Nakamoto, Satoshi. "Bitcoin: A peer-to-peer electronic cash system." Consulted Jan. 2012 (2008): 28. Obtained from http://www.cryptovest.co.ok/resources/Bitcoin%20paper%20 Original.pdf on Apr. 6, 2015.
Bitcoin, Inc. "What are multi-signature transactions?", Obtained from http://bitcoin.stackexchange.com/questions 3718/ what-are-multi-signature-tranacations on Apr. 6, 2015.
Verilog, http://www.veriog,comm/, accessed May 12, 2914.
L. Woods, Zs. Istvan, G. Alonzo, Ibex(2014) An Intelligent Strorage Engine with Support for Advanced SQL Off-loading. VLDB 2014k, Hangzhou, China, Sep. 2014.
University of British Columbia, Department of Electrical and Computer Engineering, http://www.ece.ubc.ca//~edc/379,ian99/lecgureslec 13.pdf, accessed May 2014.
IEEE P1076 Working Group. http://www.eda.org/twiki/bin/view.cgi/P1076, accessed May 12, 2014.

* cited by examiner

POLICY-MANAGED SECURE CODE EXECUTION AND MESSAGING FOR COMPUTING DEVICES AND COMPUTING DEVICE SECURITY

CROSS-REFERENCE TO RELATED APPLICATIONS

This application is entitled to the benefit of, and claims priority to U.S. Provisional Application 62/046,640, filed on Sep. 5, 2014.

TECHNICAL FIELD

The present invention relates to the technical fields of Computer security, Mobile Computing, Telecommunications, Digital Communications, and Computer Technology.

BACKGROUND OF THE INVENTION

Recent years have brought the emergence and rapid proliferation of mobile computing devices such as mobile telephones or "handsets" with extensive computing, communication, and input and interaction capabilities ("smart phones") plus growing array of other mobile computing devices such as touchscreen tablets, "netbooks", electronic document readers, and laptops in a wide range of sizes with wireless and wired communication capabilities. This proliferation of mobile devices has been accompanied by complementary advances in development and adoption of long range wireless broadband technologies such as 3G and 4G, as well as commonplace deployment of shorter range wireless technologies such as the 802.11 series of wireless standards and "Bluetooth" short range wireless, all with considerable bandwidth. These technologies span multiple radio frequency bands and protocols. Alongside the radio transceivers for such communications capabilities, many of these devices also contain an array of onboard sensors such as cameras, microphones, and GPS receivers plus other locating technologies, as well as considerable fixed-onboard and removable memory for information and multimedia storage. Furthermore, smartphones and similar devices are typically capable of running a wide variety of software applications such as browsers, e-mail clients, media players, and other applications, which in some cases may be installed by the user.

Along with the profusion of smartphones and other mobile, wireless-capable devices, there has also been a dramatic increase in the use of social networks and related technologies for information sharing for consumer as well as for professional uses. Because social network applications on mobile devices tend to use an extensive array of sensors and features, access to the applications and services has heightened concerns about individual, government, and corporate information security, and about possibilities for privacy violations and other unintended and undesirable information sharing. Furthermore, the possible professional and personal use of any given handset presents a complex set of usage contexts under which rules for device capability usage and information access need be considered.

Such sophisticated and capable smartphones and similar devices, along with the vast amounts of information that they can contain and access, present a large set of potential security vulnerabilities (a large "attack surface") that might allow information to be accessed by malicious parties or allow undesirable use and exploitation of device capabilities for malicious purposes such as "phishing" fraud, other online fraud, or inclusion in botnets for spam transmission, denial-of-service attacks, malicious code distribution, and other undesirable activities. Furthermore, compared with conventional desktop personal computers, smartphone handsets by nature are small and portable and thus more easily stolen. Portability also means that the devices will encounter security contexts that cannot be foreseen, and which may only occur the one time they are used.

Privacy concerns have also grown significantly, given the network capabilities of the devices as well as in some cases the presence of cameras, microphones, and other sensors that may capture sensitive information. The mobile threat landscape is complex and presents a vast set of extant and emergent security and privacy concerns. There is, therefore, a growing need to improve upon not only the degree of protection provided by components and systems that enhance the security of mobile devices, but also to improve on the security of such security-related components and systems themselves, so that both they and the devices and the information that they protect are more robust and are better able to withstand attempts to thwart or otherwise compromise them.

What is needed is a system that facilitates secure communications (transmission) and execution of code that is compatible with handheld and mobile devices and other constrained devices such as those in the "Internet of Things" which refers to unconventional devices that may connect to the Internet. It must be capable of easily reconfiguring for different security contexts, and it must allow every application, sensor, or asset on the device to be managed separately.

One key approach to defending these security-related systems and components from malicious attack and to prevent undesired information disclosure is to have all or parts of the valued information and executable code reside within especially secure areas, partitions, or environments on device hardware that are designed to be inaccessible to unauthorized parties and/or for unauthorized purposes, and are separated from the main device operating system and, in some cases, from certain of its resources. Examples of such secure environments are the Trusted Execution Technology by Intel Corporation http://intel.com, and the TrustZone® by ARM Ltd. http://arm.com. However, none of these allow the independent management of each application, sensor, and asset on the device according to a specified security context. Granular security policy can only be accomplished if each asset/component can be managed independently. A further degree of security can be provided if such secure partitions or areas are also invisible and undetectable to the greatest degrees possible under unauthorized circumstances and by unauthorized parties. The present document describes novel uses and applications of such secure environments (SEs) and secured capabilities.

SUMMARY OF THE INVENTION

The invention disclosed herein describes a system for a secure environment for code execution and communication (transmission) that operates on mobile or handheld devices but may operate on other computing devices as well. It uses a secure partition approach whereby encrypted files of executable code are identified, cleared for execution by an adjudicating component based on an enforced security policy, and then disposed of after use.

DESCRIPTION OF THE INVENTION

Figure 1:
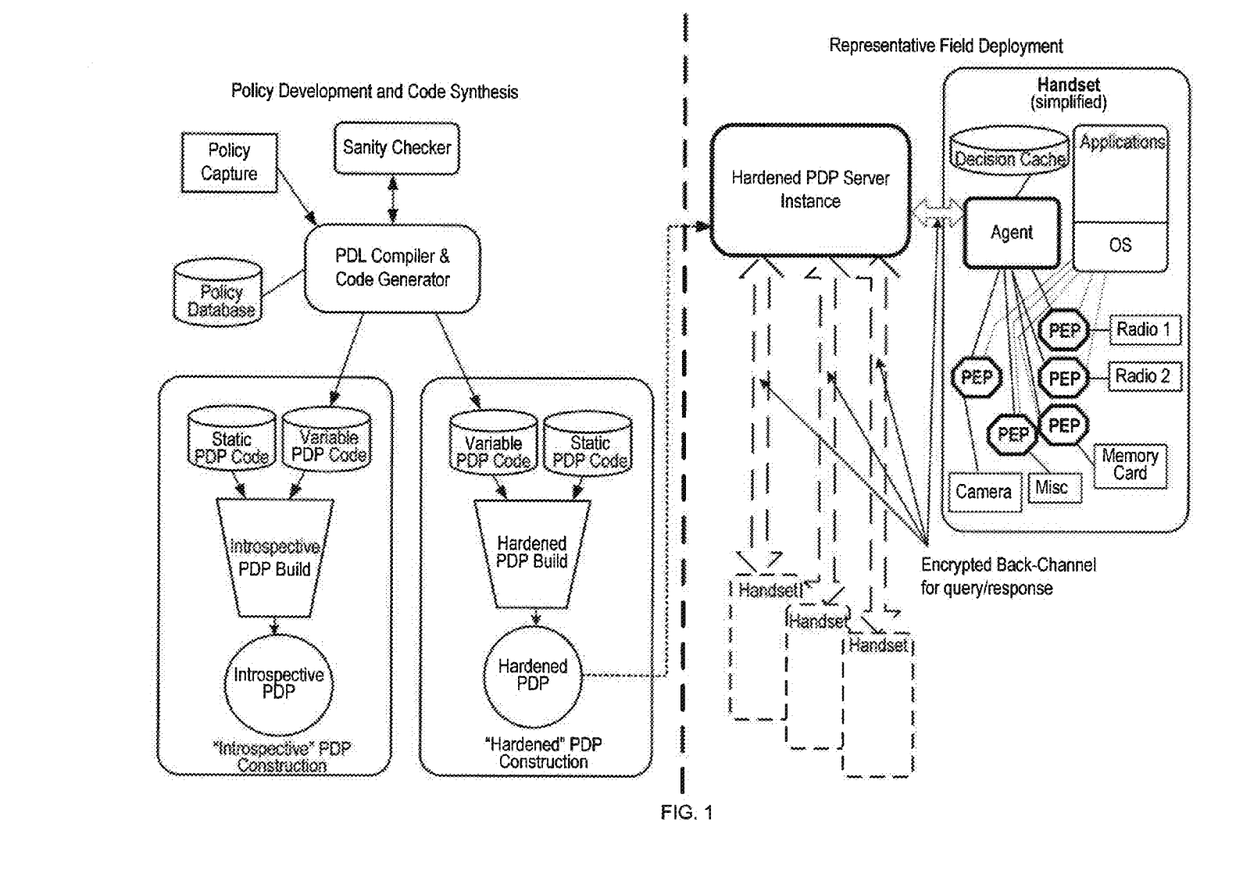
FIG. 1. Schematic representation of basic system

U.S. Pat. No. 10,169,571 discloses a system for policy-based access control and management for mobile computing devices. That application is included by reference as if fully set forth herein. The basic system presented in that application is summarized in FIG. 1. The system described therein provides extensive granularity of control over permitted operations, plus network, file system, and device access on handsets controlled by the system. Furthermore, the system utilizes one or more policy decision point (PDP) servers which respond to encrypted queries from handsets controlled by a given instance of the system. These PDP servers may be remote from the handset, or may even be hosted within the handset. The queries typically encapsulate requests for use of specific handset or network-accessible assets, and the PDP response to such a request is then received by the querying handset, with subsequent decisions made by the PDP then enforced at the Policy Enforcement Points (PEPs) on the handset. Note that for the purpose of brevity in the present Description, we use the term "handset" largely in regard to "smartphone" devices and similar phone devices, but we consider our invention to be generally applicable for the case of any computing device that might be a client in our system. Furthermore, in co-pending U.S. patent application Ser. No. 15/306,066, we have presented the integration of our PDP and PEP capabilities within SEs in various ways. In the following sections, we present new methods for ensuring secure code execution and secure communications.

1. Policy-Managed Secure Code Execution

Among the additional desired capabilities are secure dissemination of software code into the secure environment, and managed, secure execution of code within the secure environment. These capabilities can be provided in the following way. First, we note that our system as described in U.S. Pat. No. 10,169,571 provides a secure means of communication via a "backchannel" between server and handset using a UDP harness or other transmission protocol, and employing data encryption. A set of data, hereinafter referred to as a "blob", is caused to be present in the secure area either via the secure backchannel or by other secure means. The blob contains a special identifier, such as a "magic number", that designates the blob as containing executable code for special handling. Content in the blob may be encrypted if desired. Encryption may be performed by means such as asymmetric or symmetric encryption, or by other means. Detection of the presence of such a blob may be performed by a filter running as a service or task, whether scheduled, or on demand, or the detection may be accomplished by other means. The following three steps are made to occur when a blob has been detected.

1) If the file is encrypted, decrypt the file
2) Execute the executable code in the content
3) Delete the file and any decrypted contents The above steps may be performed through the execution of a blob handler script, or by other means. Security can be enhanced by performing these steps within the secure environment.

Figure 3:
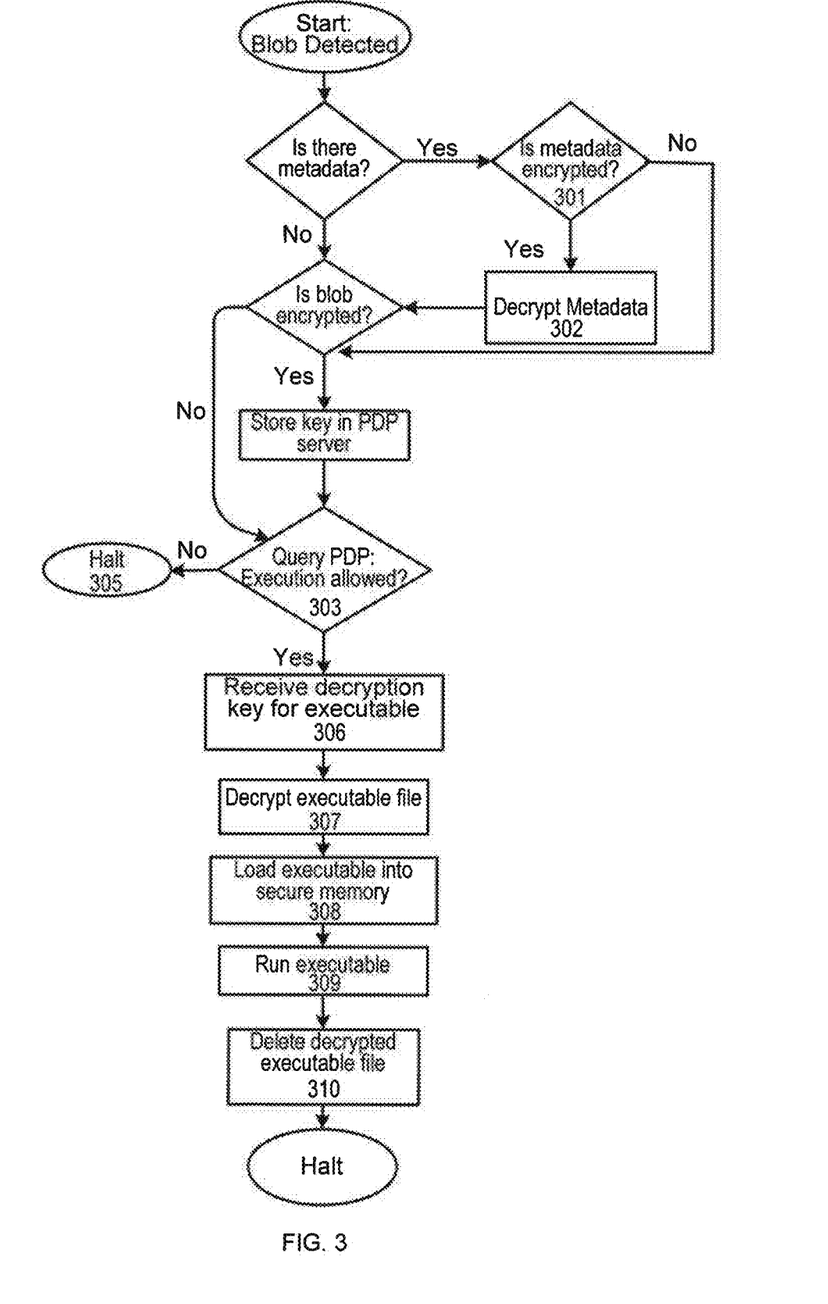
FIG. 3. Flowchart of secure code detection and execution

We can extend this secure execution capability and control and manage execution with policies by adding additional metadata to the information contained in the blob (see FIG. 3). Such additional metadata may include PDP author, time of authoring, machine on which the blob was created, and other identifying or supporting information that may be used in the subsequent PDP query. This metadata, if encrypted, is then decrypted using one encryption key-pair in the case of asymmetric encryption, or with a decryption key, in the case of symmetric encryption (301). Required portions of that key as needed for decryption of the metadata are made available in the secure environment. The remainder of the blob is encrypted using a separate key-pair. One of the two required members of the separate key pair is then stored in the PDP server (304). Now we can extend the prior steps to form the following sets of steps:

1) Decrypt the metadata if it was encrypted. (302)
2) Perform a query to the PDP server (303) using the UDP harness regarding whether execution of the blob-contained code is permissible. The query includes any necessary contextual information from the handset for performing the PDP decision computation.
3) If the PDP response is to deny the execution, the second key-pair component is not provided and processing of the blob is halted. (305)
4) If the code execution of the blob-contained code is permissible, the PDP server responds with an appropriate "allow" response, and also includes the requisite key portion of the second key-pair (306), such that the executable code in the blob can be decrypted (307). With the necessary key for decryption provided, the executable code in the blob is decrypted to a file. The decrypted file is loaded into secure memory (308) and executed (309). The decrypted file is then deleted (310).

These latest steps represent fully policy-managed, secure code execution.

2. Secure, Contained Application Execution

Figure 2:
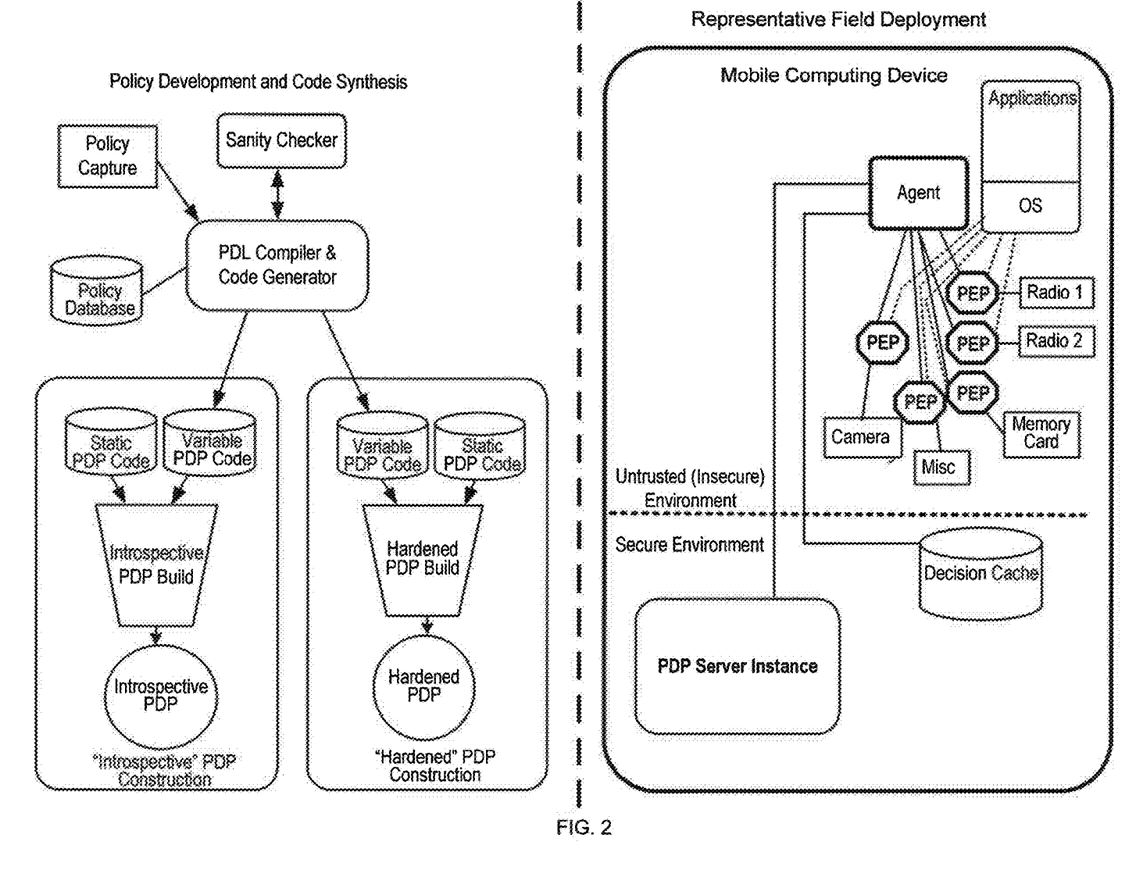
FIG. 2. Representation of system with Secure Environment utilization
Figure 4:
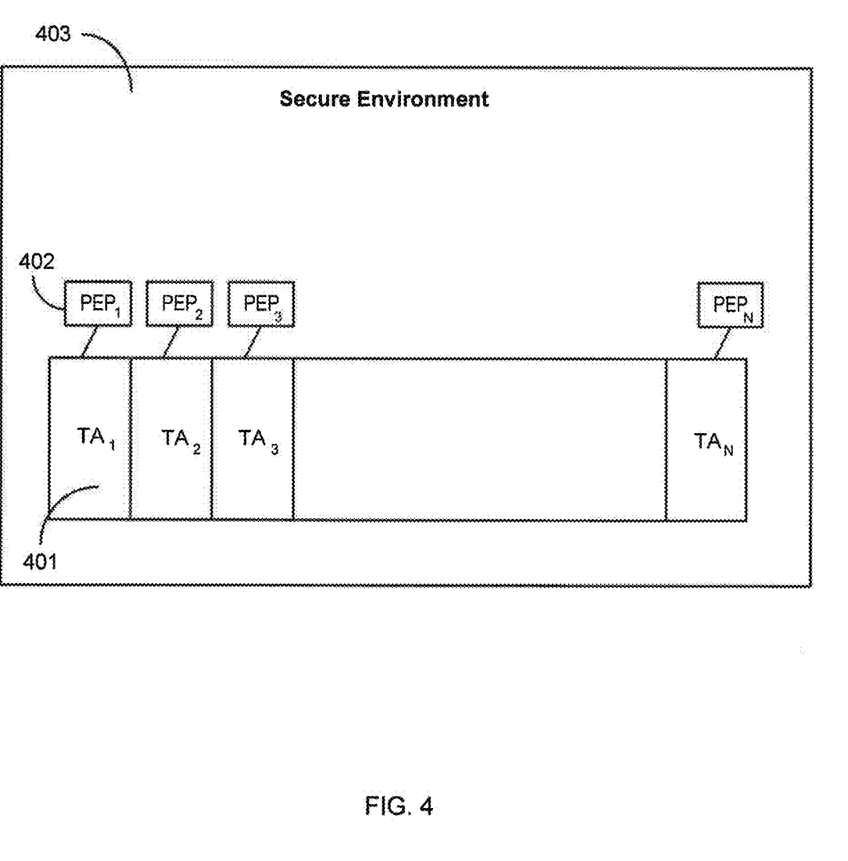
FIG. 4. Schematic representation of Containerized Application Control
Figure 5:
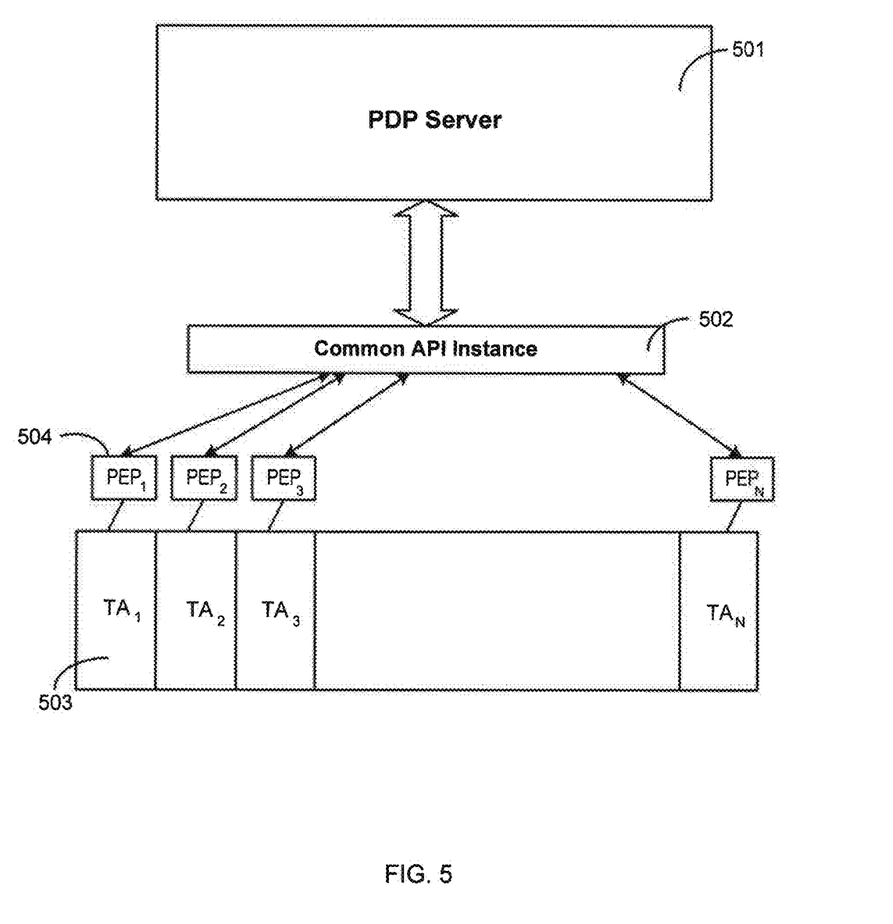
FIG. 5. Schematic representation of Containerized Application Control with Common API and PDP FIG. 6. Schematic representation of Containerized Application Control with Independent Communication APIs and Common PDP FIG. 7. Schematic representation of Containerized Application Control with Independent Communication APIs and Independent PDPs

Beyond overall defense against malicious attack and misuse of applications and device capabilities, one of our additional goals is to minimize the potential impact of a security breach into a given application or resource. We present now a new method for limiting the possible impact of such a breach, through a container-based approach that uses an extension of our system architecture that was shown in FIGS. 1 and 2. In this new approach, represented schematically in FIG. 4, each trusted application ($TA_i$) (401) resides within a segregated area in memory (403), a memory segment for which access and execution is fully controlled or "wrapped" by a corresponding Policy Enforcement Point ($PEP_i$) (402). Note that in each of the variants described here, each $TA_i$ has its own PEP and thus is managed independently. Attempts to access or otherwise act on $TA_i$ are then intercepted by $PEP_i$, resulting in a query from $PEP_i$ to a PDP (501) to obtain a decision on whether the attempted action on $TA_i$ is allowed or denied. The resultant decision is then enforced by $PEP_i$. In the absence of an available PDP, or for performance reasons or other reasons, a decision cache (PDP cache) may be utilized by the $PEP_i$ to obtain the required decision. Such a segmented design with independent PEP control of each TA allows for the following three architectural variants and other variants within our invention:

1. (See FIG. 5) Every $TA_i$, (503) via its associated PEP (504), has access to a single applications programming interface (API), or other means for communicating with PDP instances (501) that is common to all TAs. This API resource and any associated PDP cache is shared across all TAs (502).

Figure 6:
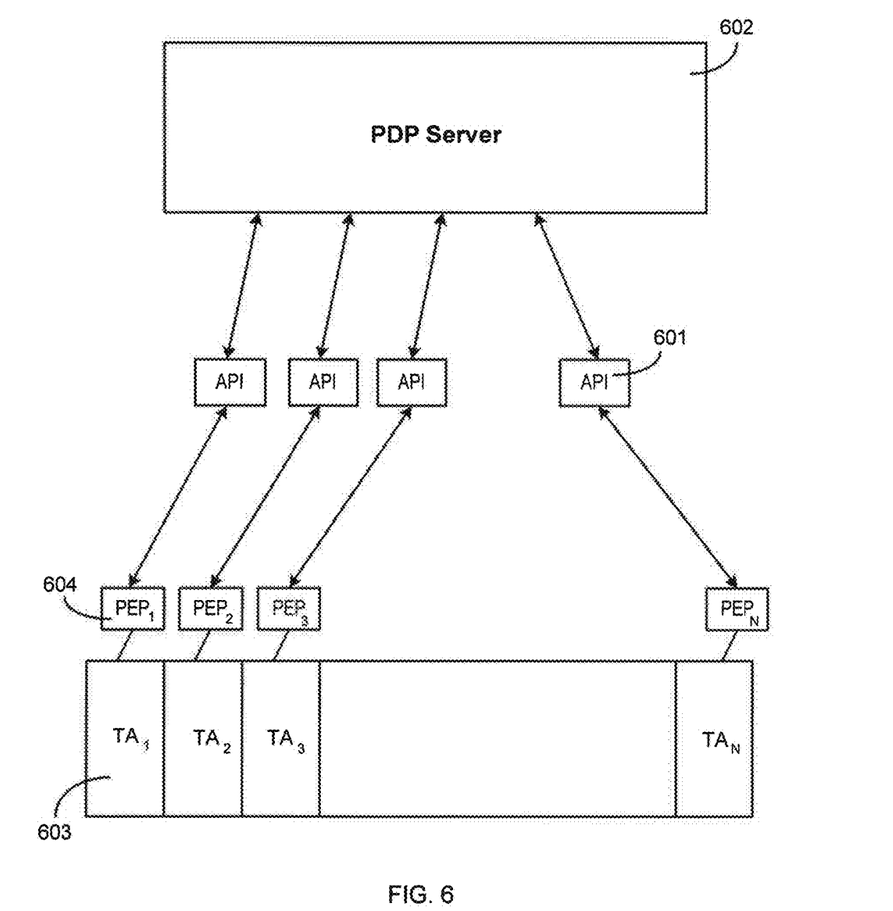

2. (See FIG. 6) Each $TA_i$ (603) via its associated $PEP_i$ (604) has its own independent applications programming interface (API) (601), or other means for communicating with PDP instances, that is not available to other TAs. PDP instance(s) are a shared resource (602), but each $TA_i$ has an independent PDP cache.

Figure 7:
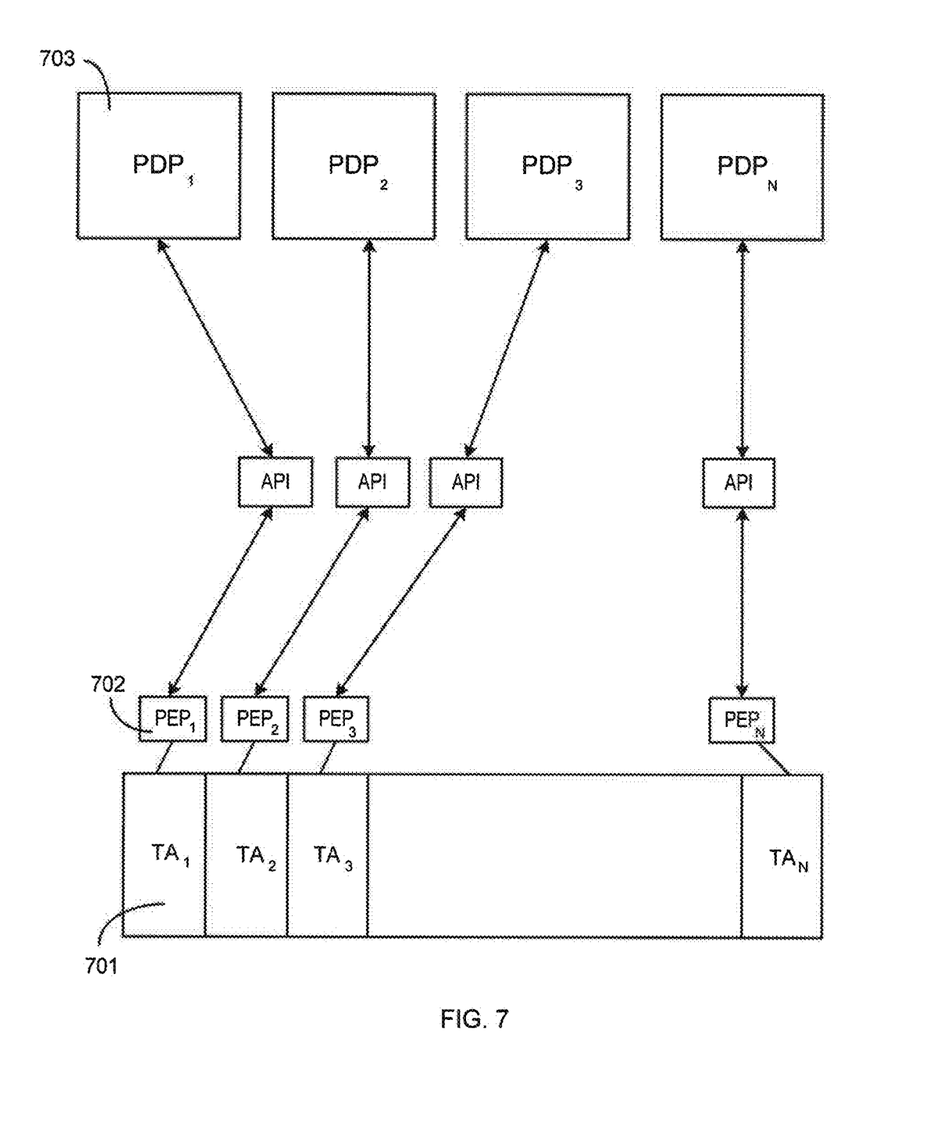

3. (See FIG. 7) Each $TA_i$ (701) via its associated $PEP_i$ (702) has access to its own independent PDP instance (703) and PDP cache. In this case, there is a PDP instance, $PDP_i$, dedicated to each $TA_i$-$PEP_i$ pair.

The above variants have different resource requirements and different security implications, as follows.

First, in variant 1 above, resource usage is efficient due to sharing of the API and cache. However, the single shared resource set therein represents a large single "attack surface" to malicious parties and other unintended access attempts, and also represents a single point of failure.

Second, in variant 2 above, as compared with variant 1, resource usage will generally be greater due to individual PDP communication means and individual caches, but these separated, independent resources mean that any given TA is less susceptible to impact from an attack that may have compromised another TA in the system.

Variant 3 above is generally the most resource-expensive of the three cases, since a separate PDP instance is required for each TA, along with an independent PDP cache. However, variant 3 is also the most secure in the sense that no $TA_iPEP_iPDP_i$ triplet is directly impacted by, or vulnerable to, an attack on any element of a separate triplet. Variant 3 therefore gives the strongest separation of the three variants presented. If one container is breached then ideally others would not be impacted. The objective is to keep policies and resources for each TA+PEP+PDP instance separated so that cross contamination effects can be limited or mitigated.

3. Secure Messaging

One of the primary privacy concerns regarding modern handsets and related devices is in regard to potential undesired interception or other unauthorized viewing of interpersonal communications such as text messaging or instant messaging (IM), and email. Privacy can be enhanced by coupling together the capabilities of secure environments as described previously, and secure user interfaces, such as the Trusted User Interface (TUI) as described by the Global Platform organization (https://globalplatform.org/latest-news-overview/). Information entered with, or displayed via, a TUI, is independent of, and not accessible by, the host operating system of the device. This combination of TUI and SE thus provides an independent, secure "channel" to and from the handset user that can be utilized for IM, email, and other messaging methods and formats. We can further enhance the security and privacy of such secure messaging by coupling it with a policy-based management system such as that described in U.S. Pat. No. 10,169,571, and further, by encapsulating the messaging application in a PEP-controlled application container as described in the prior section. In this way, actions such as the transmission, reception, and display of messages can be governed, and allowed or denied as appropriate according to authored policies such as individual and corporate policy sets.

INDUSTRIAL APPLICATION

The invention pertains to securing computing devices from threats associated with the execution of code on the local device, including mobile computing devices, in any industry where that may be of value or importance. The invention includes an extension of the system to address vulnerabilities associated with interpersonal messaging to include text or instant messaging as well as email.

What is claimed is:

1. A system for secure transmission and managed execution of executable code within an encrypted file bundle on a computing device, the system comprising:

a file identifier for identifying the encrypted file bundle containing executable code;

a secure memory for storing executable code as independent trusted applications;

a policy server coupled to the secure memory and communicatively coupled to the file identifier via an encrypted backchannel, for adjudicating requests from a requestor regarding permissibility of execution of the executable code within the file bundle, where the adjudication of the request is completely hidden from the requestor;

a decryption key stored in the secured memory for decrypting the encrypted file bundle and for storing the decrypted executable code in the secure memory when the policy server approves a request to execute the executable code within the file bundle;

a policy enforcement point for each independent trusted application coupled to the policy server for enforcing policy decisions from the policy server pertaining to the execution of the trusted application; and at least one processor coupled to the policy enforcement points for executing the decrypted executable code as independent trusted applications.

2. The system of claim 1, wherein the file bundle contains additional contextual information or metadata.

3. The system of claim 2, wherein the contextual information is encrypted using an encryption key or encryption protocol different from the encryption key for the executable portion of the file bundle.

4. The system of claim 1, wherein each policy enforcement point is coupled to the policy server via a shared applications programming interface.

5. The system of claim 1, wherein each policy enforcement point is coupled to the policy server exclusively through a separate applications programming interface via each independent policy enforcement point.

6. The system of claim 1, wherein each policy enforcement point is coupled to an independent policy server through a separate applications programming interface via each independent policy enforcement point.

7. A method for secure transmission and managed execution of executable code within an encrypted file bundle on a computing device, the steps comprising:
- intercepting a request from a requestor to execute executable code within an encrypted file bundle where the interception is hidden from the requestor;
- receiving the request at a policy server;
- retrieving the encrypted file bundle and a decryption key to the encrypted file bundle;
- extracting the decryption key from the encrypted file bundle and storing said decryption key in a secure memory;
- adjudicating the request at the policy server where the adjudication is hidden from the requestor;
- retrieving the decryption key from the secure memory and decrypting the encrypted file bundle when the request to execute the executable code is granted;
- storing the decrypted executable code within the file bundle in the secure memory as independent trusted applications;
- enforcing the policy rules as indicated by the policy server; and
- executing the executable code as independent trusted applications.

8. The method of claim 7 further including the steps:
- detecting if the encrypted file bundle contains metadata; and
- transmitting the metadata to the policy server.

9. The method of claim 7 further including the steps:
- detecting if the encrypted file bundle contains metadata;
- decrypting the metadata before adjudicating the request at the policy server when the file bundle contains metadata and the metadata is encrypted; and
- transmitting the decrypted metadata to the policy server.

* * * * *